(12) United States Patent
Higashida et al.

(10) Patent No.: US 10,970,666 B2
(45) Date of Patent: Apr. 6, 2021

(54) TRANSPORTATION AND SHIPPING MANAGEMENT SYSTEM

(71) Applicant: ASKUL Corporation, Tokyo (JP)

(72) Inventors: Keisuke Higashida, Tokyo (JP); Takahiro Kaneko, Tokyo (JP); Shota Terada, Kanagawa (JP); Kazuyuki Ikeda, Kanagawa (JP)

(73) Assignee: Askul Corporation, Tokyo (JP)

( * ) Notice: Subject to any disclaimer, the term of this patent is extended or adjusted under 35 U.S.C. 154(b) by 215 days.

(21) Appl. No.: 16/382,500

(22) Filed: Apr. 12, 2019

(65) Prior Publication Data

US 2019/0318307 A1    Oct. 17, 2019

(30) Foreign Application Priority Data

Apr. 16, 2018 (JP) .............................. JP2018-078490

(51) Int. Cl.
    *G06Q 10/08* (2012.01)

(52) U.S. Cl.
    CPC ..... *G06Q 10/0835* (2013.01); *G06Q 10/0838* (2013.01)

(58) Field of Classification Search
    CPC ......... G06Q 10/0835; G06Q 10/08355; G06Q 10/0838; G06Q 10/06; G06Q 10/087; G01G 19/40; B67D 7/08
    USPC .................................. 705/400, 413, 414, 415
    See application file for complete search history.

(56) References Cited

U.S. PATENT DOCUMENTS

| | | | |
|---|---|---|---|
| 9,617,140 B2 * | 4/2017 | Hershberger | B67D 1/0878 |
| 10,373,118 B1 * | 8/2019 | Lefkow | G06Q 10/0875 |
| 10,613,533 B1 * | 4/2020 | Payson | G06Q 10/087 |
| 10,796,553 B2 * | 10/2020 | Carson | G01K 3/005 |
| 10,810,540 B1 * | 10/2020 | Gopal | G01G 19/42 |
| 2006/0136237 A1 | 6/2006 | Spiegel et al. | |

(Continued)

FOREIGN PATENT DOCUMENTS

| | | |
|---|---|---|
| JP | 2004-115256 A | 4/2004 |
| JP | 2008-524714 A | 7/2008 |
| JP | 2017/220126 A | 12/2017 |

OTHER PUBLICATIONS

"Exchange Carts—Better Service and Profitability" by Scott C. Sloan, Published 2009 by HandCraft Services, https://web.archive.org/web/20091014153247/http://www.handcraftservices.com:80/news/wp-content/uploads/2009/04/exchange-carts-reprint-lr.pdf (Year: 2009).*

(Continued)

*Primary Examiner* — Rupangini Singh
*Assistant Examiner* — Christopher Gomez
(74) *Attorney, Agent, or Firm* — Marshall, Gerstein & Borun LLP

(57) ABSTRACT

A system for managing a selling system for shipping out an item from a warehouse or a nearest base associated with a delivery destination, includes an instruction unit configured to, before receiving an order placement for an item from a customer, transmit, to a warehouse server associated with the warehouse or a relay base server associated with a relay base, a transportation instruction for transporting the item to the nearest base from the warehouse or the relay base, and to, after receiving the order placement for the item from the customer, transmit, to a nearest base server associated with the nearest base, a submission instruction for submitting the ordered item to the customer.

14 Claims, 13 Drawing Sheets

(56) References Cited

U.S. PATENT DOCUMENTS

| | | | |
|---|---|---|---|
| 2009/0112738 A1* | 4/2009 | Nagata | B41J 2/17559 |
| | | | 705/28 |
| 2012/0072363 A1 | 3/2012 | Spiegel et al. | |
| 2012/0150677 A1* | 6/2012 | Shuster | G06Q 30/0633 |
| | | | 705/26.1 |
| 2012/0189762 A1* | 7/2012 | Reineccius | A01C 1/06 |
| | | | 427/4 |
| 2012/0323645 A1* | 12/2012 | Spiegel | G06Q 10/083 |
| | | | 705/14.1 |
| 2014/0278508 A1* | 9/2014 | Akdogan | A61J 7/02 |
| | | | 705/2 |
| 2016/0171568 A1* | 6/2016 | Cao | G06Q 10/0832 |
| | | | 705/34 |
| 2017/0147969 A1* | 5/2017 | Narsingh | G06Q 10/087 |
| 2017/0217011 A1* | 8/2017 | Savage | G07F 11/62 |
| 2019/0188629 A1 | 6/2019 | Fujisawa | |

OTHER PUBLICATIONS

Office Action in JP Application No. 2018-078490 dated Oct. 29, 2019, 13 pages.

\* cited by examiner

| TEMPORARY STORAGE PLACE | CUSTOMER | ADDRESS |
|---|---|---|
| S001 | C001 | · · · |
| | C002 | · · · |
| | C003 | · · · |
| S002 | C004 | · · · |
| | C005 | · · · |

| TEMPORARY PLACING PLACE | ITEM | QUANTITY |
|---|---|---|
| S001 | P001 | 120 |
| | P002 | 30 |
| | P003 | 10 |
| S002 | P001 | 80 |
| | P004 | 30 |

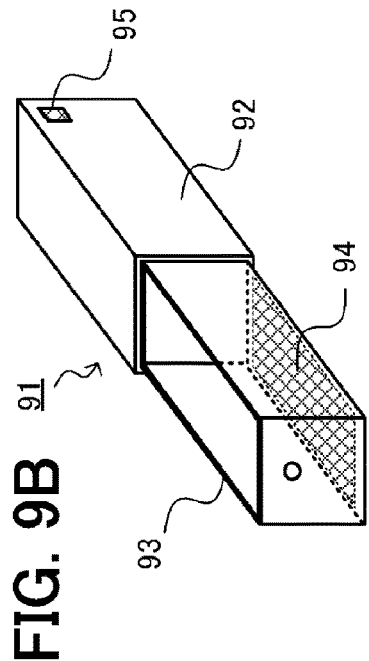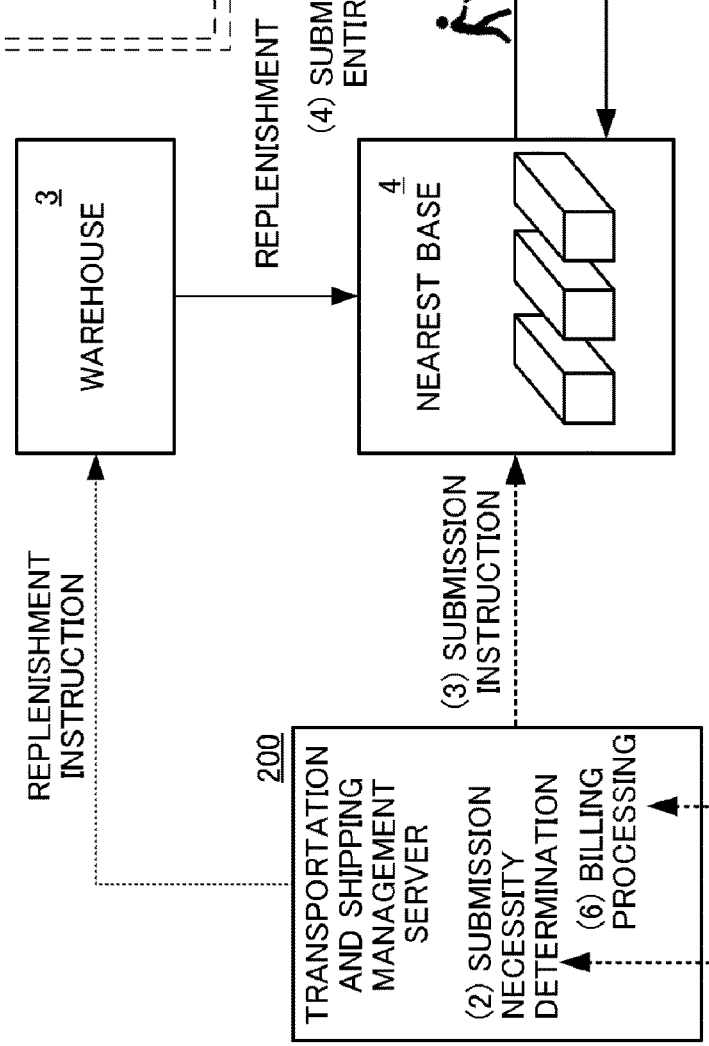
FIG. 9A
FIG. 9B

TRANSPORTATION AND SHIPPING MANAGEMENT SYSTEM

BACKGROUND OF THE INVENTION

Field of the Invention

The present invention relates to a transportation and shipping management system that manages the transportation and shipping of an item.

Description of the Related Art

In recent years, the delivery efficiency is desired to be enhanced in accordance with the increase in the amount of distribution. Moreover, the time necessary for an item to be delivered after a customer places an order is also desired to be shortened.

Japanese Translation of PCT Application No. 2008-524714 discloses a feature in which anticipatory shipment that does not completely designate the delivery destination is performed before receiving an order from a customer, and the delivery destination of the item is determined and the delivery is performed at the time point at which the order from the customer is received during the transportation of the item. In the method above, the delivery efficiency is improved when the prediction comes true, but extra labor such as the storage and the management of the item is needed when the prediction fails. In particular, the success of the anticipatory shipment becomes more difficult as the time necessary from the shipment to the delivery becomes shorter.

Japanese Patent Application Laid-open No. 2004-115256 discloses a so-called "household medicine" type sale in which an item is placed at the place of a customer, and the cost of the item is collected and the item is replenished when the item is consumed. In the method, the item needs to be placed at the place of the customer, and hence the method is only for small items that are consumed little by little. That is, it is difficult to apply the method to large items that are consumed by large amounts.

In small-lot home-delivery distribution networks provided by existing large shipping carriers, the state in which the balance in the material amount is established between the collection of cargo and the shipping is considered to be the most efficient, but there is a feature in which a large amount of cargo flows in one direction at a time due to the growth of e-commerce. Therefore, the balance in the distribution network that specializes in conventional home delivery is disrupted and the efficiency is degraded, thereby becoming a cause of social problems that cause a lack of drivers, the rise in distribution costs, and the like.

CITATION LIST

Patent Literatures

Patent Literature 1: JP2008-524714A
Patent Literature 2: JP2004-115256A

SUMMARY OF THE INVENTION

As described above, there is a social challenge in which the sustainability of the conventional distribution network is threatened due to the increase in the amount of distribution in home delivery in association with the growth of e-commerce. The distribution efficiency needs to be improved in order to prevent the collapse of the distribution. It is desired to not only improve the distribution efficiency but also lower the entry barrier for shipping staff and shipping carriers and enable the distribution supplying capacity to be increased.

Thus, an object of the present invention is to provide a new distribution method that is efficient and sustainable, and a transportation and shipping management system for realizing the distribution method while minimizing the load on existing distribution networks.

A first aspect of the present invention is a transportation and shipping management system for managing a selling system for shipping out an item from a warehouse or a nearest base associated with a particular delivery destination in accordance with a delivery destination, the transportation and shipping management system including instruction unit for, before receiving an order placement for an item from a customer, transmitting, to a warehouse server associated with the warehouse, a transportation instruction for transporting the item to the nearest base via the warehouse, and for, after receiving the order placement for the item from the customer, transmitting, to a nearest base server associated with the nearest base, a submission instruction for submitting the item, the order of which is placed, to the customer.

The item transportation to the nearest base from the warehouse may be performed via one or a plurality of the relay bases. When the item is also temporarily stored in the relay base, the transportation instruction to the nearest base may be transmitted to the relay base server associated with the relay base. In this case, the item is transported to the nearest base from the relay base.

The nearest base may be provided in a place within a short distance such as in the same building as the customer or a place near the building. The short distance may herein mean a distance within which the use of a vehicle is unnecessary for the submission of the item, and the submission can be performed on foot or by a bicycle, a motorcycle, or the like. The region covered by one nearest base is small, and hence it may be desired that a large number of the nearest bases be provided to cover the entire targeted area be covered.

According to this aspect, the transportation of the item to the nearest base from the warehouse can be performed in consideration of the availability of a transportation vehicle, and hence the loading efficiency is expected to increase and the automobile rank and the rank of the transportation vehicle is expected to reduce. The transportation of the item to the nearest base from the warehouse by passing through the relay base can be performed at desirable timings between the bases by considering the availability of the transportation vehicles between the bases. The distance from the nearest base to the customer (submission destination) is short and the use of a vehicle and is unnecessary, and hence the entry barrier for the shipping staff and the shipping carriers at last-mile part is low and the distribution supplying capacity is easily secured.

In this aspect, the item is stored in the nearest base, and hence the time from the reception of the order to the submission can be significantly shortened as compared to before.

This aspect may further include:

storage unit for storing quantity information of the item temporarily stored in the nearest base;

order reception unit for acquiring order placement information including an item identifier, a quantity, and a delivery destination; and determination unit for determining whether a condition in which the delivery destination included in the order placement information is associated with the nearest base and the item indicated by the item identifier is present in the nearest base in the quantity or more is satisfied, in which the instruction unit may transmit the submission instruction to the nearest base server when the condition is satisfied, and transmit a shipment instruction corresponding to the order placement information to the warehouse server when the condition is not satisfied. The item shipped out from the warehouse may be carried to the customer (submission destination) by passing through the nearest base.

As described above, for the items which the nearest base does not have sufficient stock, shipping out the items from the warehouse enables the selling of the items as before.

In this aspect, when the item is temporarily stored in the relay base, the storage unit may also store quantity information of the item temporarily stored in the relay base, and the instruction unit may transmit, to the relay base server, the transportation instruction for transporting the item to the nearest base when a total number of a quantity of the item temporarily stored in the nearest base and a quantity of the item temporarily stored in the relay base is equal to or more than the quantity included in the order placement information even when the condition is not satisfied. The transportation of the item to the nearest base from the relay base is a concept including the transportation of the item from the relay base to the next relay place.

According to the configuration as described above, even when the stock quantity of the item in the nearest base is not sufficient, the item does not need to be shipped out from the warehouse when the quantity of the items reaches the necessary amount when added with the items temporarily stored in the relay base.

In this aspect, it is also preferred that prediction unit for predicting a demand quantity of the item for the delivery destination associated with the nearest base is further included, and the instruction unit transmit, to the warehouse server, the transportation instruction for transporting the item to the nearest base from the warehouse when a difference between the predicted demand quantity of the item and the quantity of the item temporarily stored in the nearest base is less than a threshold value. When the item is temporarily stored in the relay base, the instruction unit may transmit the item to the nearest base from the relay base instead of transporting the item to the nearest base from the warehouse. The instruction unit may transmit, to the warehouse server, the transportation instruction for transporting the item to the nearest base or the relay base when a difference between a total number of the quantity of the item temporarily stored in the nearest base and the quantity of the item temporarily stored in the relay base and a predicted demand quantity is less than a threshold value. The demand prediction can be performed on the basis of the sales performance of the past.

As described above, the items are replenished, as appropriate, to the relay base and the nearest base on the basis of the demand prediction, and hence the probability of stockout in the nearest base can be minimalized. An upper limit value may be defined for the quantity for each base, and the bases can be controlled so as not to temporarily store an excessive quantity.

The instruction unit is may to determine the transportation quantity of the items to the relay base or the nearest base from the warehouse (the items, the final submission destination of which is not determined) on the basis of the predicted shipment quantity of the items from the warehouse for each time (the items, the final submission destination of which is determined). Specifically, the transportation quantity is may to be determined so that the total number of the quantity of the shipment and the transportation from the warehouse for each time is as equalized as possible. The shipment quantity from the warehouse may vary, but the transportation date can be shifted for items of which the final submission destination is not determined, and hence the shipment and transportation quantity from the warehouse can be equalized. As a result, the availability ratio enhances and the necessary transportation capacity reduces, thereby enhancing the efficiency.

The demand prediction may be performed in consideration of the planned order placement, which is a periodic purchase and the delivery date of which is not determined. That is, in this aspect, the order reception unit may be capable of also acquiring planned order placement information relating to order placement, and the prediction unit may predict the demand quantity on the basis of the planned order placement information.

The probability of the actual purchase being performed is high for the planned order placement, and hence the accuracy of the demand prediction can be enhanced by introducing the planned order placement.

In this aspect, the transportation of the item to the relay base or the nearest base from the warehouse may be performed in a state in which the item is loaded on a roll-box pallet, the item may be temporarily stored in the relay base or the nearest base together with the roll-box pallet, a weight sensor and a communication device of the roll-box pallet may be provided, and the storage unit may update the quantity information on the basis of a sensor reading value of the weight sensor transmitted via the communication device.

The stock quantity in the relay base or the nearest base can be grasped on the basis of the difference between the replenishment quantity (the transportation quantity from the warehouse to the nearest base) and the submission quantity (the delivery quantity to the customer from the relay base or the nearest base), but the stock quantity in the relay base or the nearest base can be grasped in a more reliable manner by employing the abovementioned configuration.

In this aspect, the submission instruction may include slip printing information for printing at least one of a tag label or an invoice. A delivery person at the relay base or the nearest base prints the tag label or the invoice and delivers the item to the customer.

In this aspect, the relay base or the nearest base may be associated with one or a plurality of customers. For example, the relay base or the nearest base may be present in a particular building, and the particular delivery destination may be a delivery destination in the building. Alternatively, the relay base or the nearest base may be installed on the streets as a cargo handling facility, and the particular delivery destination may be a delivery destination that is present within a predetermined distance from the relay base or the nearest base.

In this aspect, it is also preferred that:

the item be present in plurality and at least a part of the items be stored in plurality in one container;

the container is provided with a weight sensor and a communication device;

the submission instruction include an instruction for carrying a first container, which is temporarily stored in the nearest base and in which the plurality of items are stored, to the delivery destination and collecting a second container located at the delivery destination; and the transportation and shipping management system further include billing processing unit for generating billing information on the basis of a difference between a reading value of a weight sensor transmitted via a communication device of the first container, and a reading value of a weight sensor transmitted via a communication device of the second container.

According to the configuration as above, small items can be easily shipped and the billing processing can be easily performed.

In the abovementioned configuration, it is also preferred that: order placement for the items stored in the container be performed in units of containers; and order reception unit determine that an order placement information for shipping one container in which the items are stored to the delivery destination is acquired when the reading value of the weight sensor transmitted via the communication device of the container located at the delivery destination is less than a predetermined threshold value.

As described above, by assuming that the order for delivering the container is received when the weight (that is, the number of the items) in the container becomes less than the threshold value, the delivery can be performed from any of the relay base, the nearest base, or the warehouse. It is advantageous for the customer in that the customer does not need to expressly perform the order placement processing.

The present invention can be understood as a transportation and shipping management system (transportation and shipping management server) including at least a part of the abovementioned means. The present invention can also be understood as a transportation and shipping management method including at least a part of the processing performed by the abovementioned means. The present invention can be understood as a computer program for causing a computer to execute the method, or a computer-readable medium storing therein the computer program in a non-transitorily manner. The abovementioned means and processing can form the present invention by being combined with each other as much as possible.

According to the present invention, a new distribution method that is more efficient, easier, and more sustainable than the related art can be provided while minimalizing the load on existing distribution networks.

BRIEF DESCRIPTION OF THE DRAWINGS

FIG. 9A and FIG. 9B are a diagram and a view illustrating a distribution model and a cartridge container for storing separate items in Embodiment 2;

DESCRIPTION OF THE EMBODIMENTS

Details of embodiments are described below with reference to the drawings. However, the embodiments described below are merely an example, and a transportation and shipping management system, a transportation and shipping management apparatus, a transportation and shipping management method, and a transportation and shipping management program according to this disclosure are not limited to the specific configurations described below. When the embodiments are carried out, the specific configurations in accordance with the embodiments are employed, as appropriate, and various improvements and modifications may be made.

Embodiment 1

<Overview>

Figure 1A:
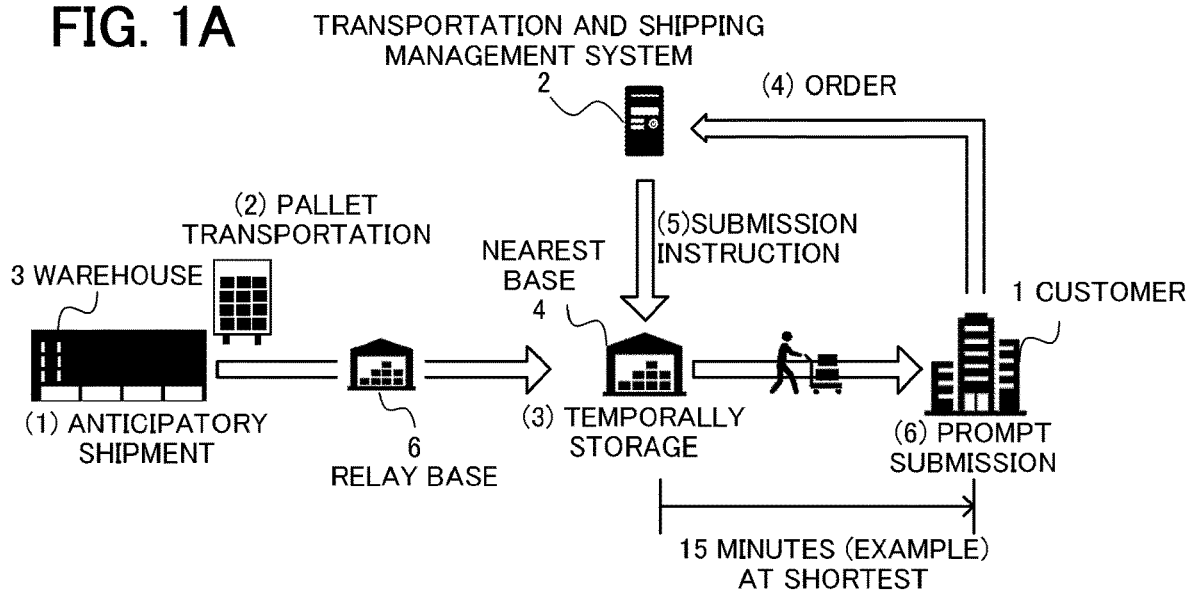
FIG. 1A and FIG. 1B are diagrams illustrating a distribution model in Embodiment 1.
Figure 1B:
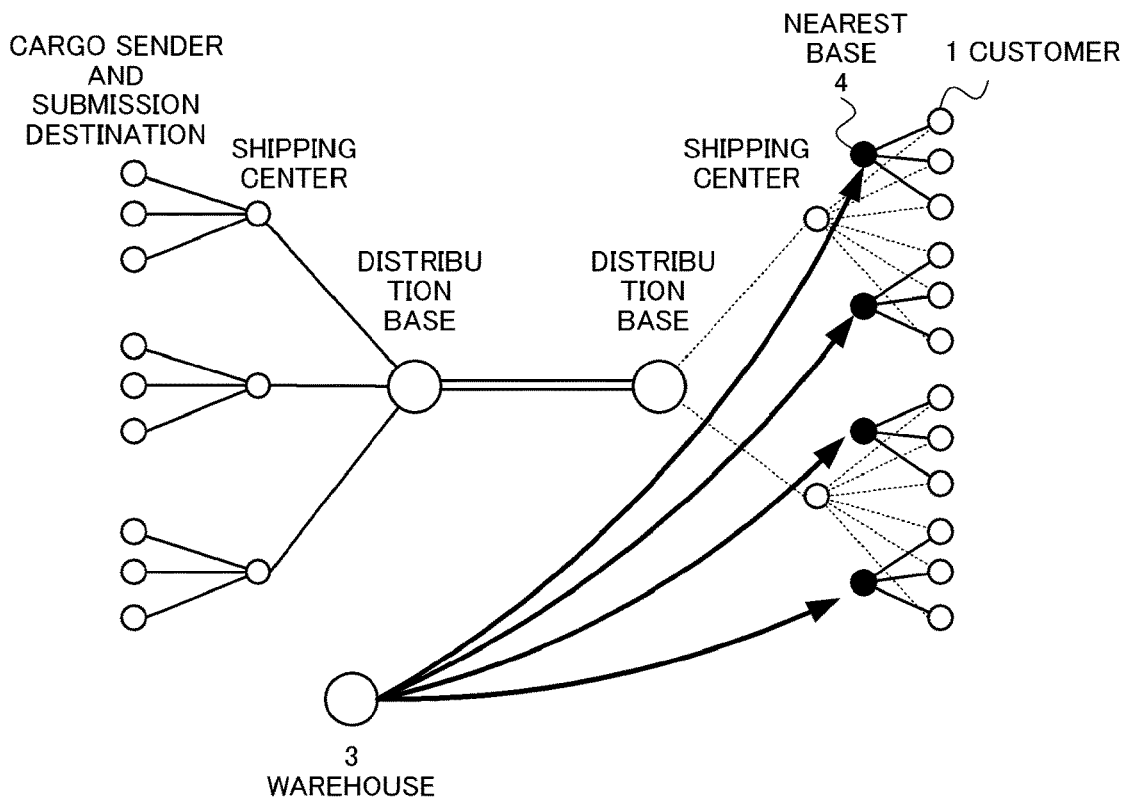
Figure 2:
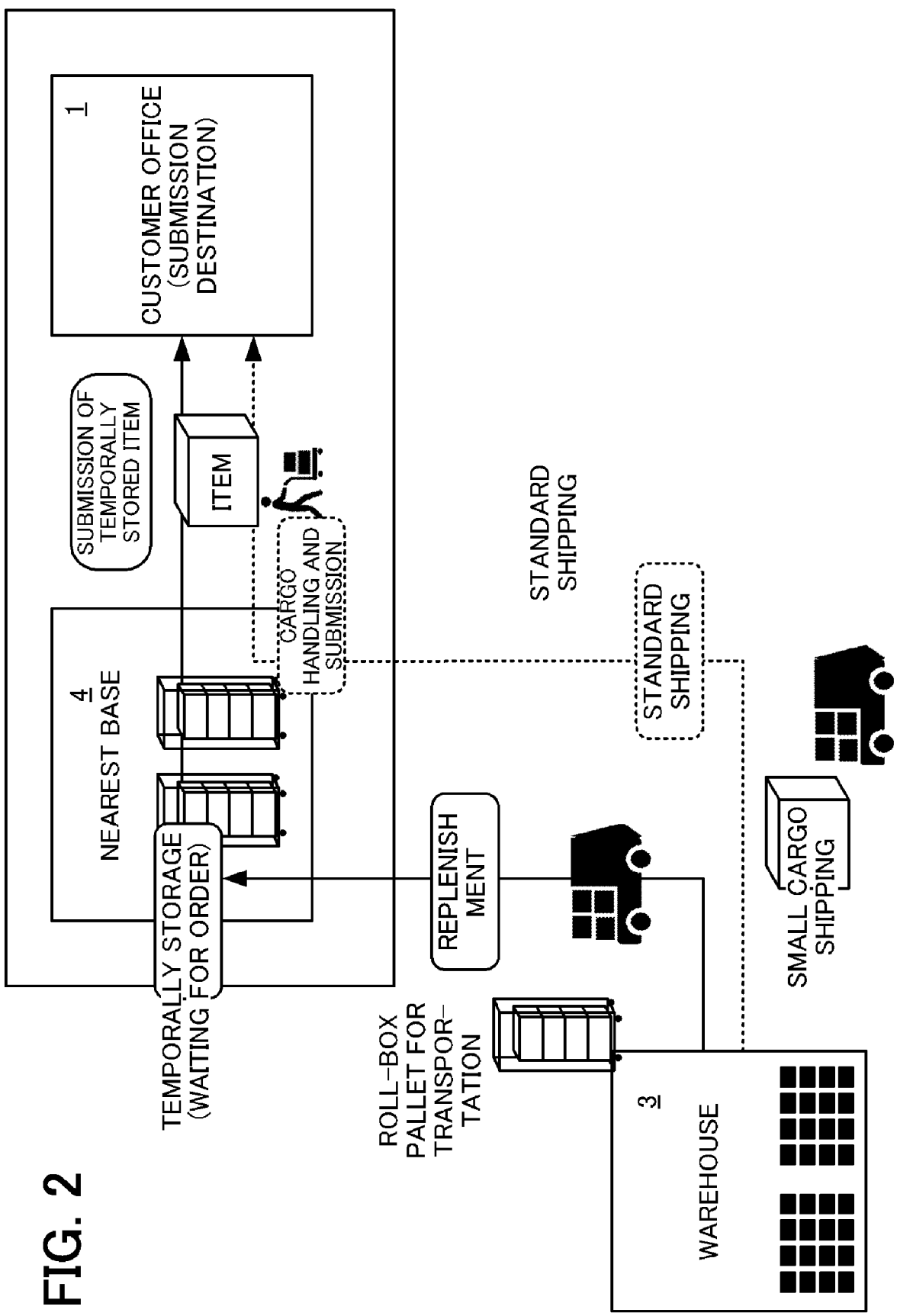
FIG. 2 is a diagram illustrating the movement of an item in the distribution model in Embodiment 1.

First, the overview of a distribution model in this embodiment is described with reference to FIG. 1A, FIG. 1B, and FIG. 2. FIG. 1A and FIG. 1B are diagrams schematically illustrating the distribution model, and FIG. 2 is a diagram illustrating the movement of the cargo in the distribution model.

In the distribution model, a nearest base 4 of an item is provided near a customer (delivery destination) 1. Further, an item predicted to be purchased by the customer 1 is transported to a relay base 6 from a warehouse 3 and is temporarily stored (temporarily placed) therein. The item is moved to the nearest base 4 from the relay base 6 at an appropriate timing, and the item is temporarily stored in the nearest base 4. When there is an order for the item from the customer, a submission instruction is transmitted into the nearest base 4 from the transportation and shipping management system 2, and a delivery person in the nearest base 4 takes out the temporarily-stored item and delivers the item to the customer 1.

In this embodiment, the warehouse 3 may include both of a company owned warehouse in which the selling company stocks and stores the item, and a warehouse of a manufacturer to which the company supplies the item.

In this embodiment, the nearest base 4 is associated with one or a plurality of particular customers 1 determined in advance. For example, the nearest base 4 is provided in a large-scale office building (for example, the base 4 is an underground cargo handling facility), and stores items for the customers 1 in the office building. Alternatively, the nearest base 4 is installed as an independent cargo handling facility in an area in which small to medium office buildings are densely built up, and stores items for the customers 1 that are within a predetermined time (for example, 10 minutes) on foot. The nearest base 4 is preferred to be provided by a large number and able to cover the entire target area.

The relay base 6 is a center or a cargo handling place through which the items pass through before reaching the nearest base 4 after the items are shipped out from the warehouse 3. Although one relay base 6 is illustrated in FIG. 1A, there may be a plurality of the relay bases 6 between the warehouse 1 and the nearest base 4. Meanwhile, there may be no relay bases 6. In FIG. 1B, the illustration of the relaying through the relay base 6 in the item transportation to the nearest base 4 from the warehouse 3 is omitted.

The expression of "center" refers to a large distribution base capable of performing automatic sorting that includes a material handling equipment for conveying and handling the cargo. A typical example of the "cargo handling place" is a space for manually sorting the cargo without including a material handling equipment.

The submission to the customer 1 from the nearest base 4 is performed by a business operator responsible for the delivery to the customer 1 from the nearest base 4, for example. The business operator may be the same business operator as the business operator that transports the items to the nearest base 4 from the warehouse 3 or may be another business operator, for example. However, the cargo is preferred to be gathered together so that the submission from the nearest base 4 (or a place further upstream the nearest base 4) to the customer 1 can be performed by one business operator. The business operator that performs submission may be a carrier that has acquired a transport business license, or may be a business operator that has not acquired a transport business license. A security guard or a concierge in a building may perform the submission. The submission can be performed on foot by a delivery person because the distance between the nearest base 4 and the customer 1 is sufficiently short, but delivery using a bicycle, a motorcycle, or a vehicle is not excluded.

As described above, in this embodiment, the items are efficiently transported before the final consumption day (submission date) while considering the quantity of temporarily stored items existing on the distribution channels from the warehouse 3 to the relay base 6 or the nearest base 4 and the availability of the transportation time and the transportation vehicle needed between the bases. The distance from the nearest base 4 to the customer 1 is short and submission can be performed on foot, for example, and hence the operation is relatively simple and easy, and the registration of the light motor truck transportation business and the like are unnecessary. Therefore, the entry barrier is low, and participation of a larger number of shipping carriers can be expected.

By moving the items to the nearest base 4 or the relay base 6 near the delivery destination in advance on the basis of demand prediction of the items, the time until delivery after receiving an order can be significantly shortened. The distance between the nearest base 4 and the delivery destination is short, and hence highly frequent delivery can also be performed.

In this embodiment, only the necessary amount of items needs to be present in the nearest base 4 before the submission date for the customer 1, and the items only need to be transported in advance when there is availability of the transportation capacity between the warehouse 3 and the relay base 6, between the relay bases 6, and between the relay base 6 and the nearest base 4. As described above, in this embodiment, the items are moved to the nearest base 4 and the relay base 6 in advance with use of a surplus transportation capacity. Hitherto, the date of shipment from the warehouse 3 is specified by the timing of the order from the customer 1, and the submission deadline is determined by adding the lead-time for the transportation and the shipping to shipment date. However, in this case, the delivery amount varies significantly day by day, thereby degrading the transport efficiency. Meanwhile, this embodiment predicts the necessary submission deadline and quantity, and from the prediction, plans backwardly how and when to move the items while managing and adjusting the intermediate flow rate at the nearest base 4 and the relay base 6. As a result, the efficiency of the transportation and the shipping can be enhanced.

When the distribution model is employed, it is basically impossible to temporarily store all the items purchased by the customers 1 in the nearest base 4 in reality. Therefore, as illustrated in FIG. 2, there are three types of items: the first is those items that are temporarily stored in the nearest base 4 and shipped out from the nearest base 4; the second is those items that are not temporarily stored in the nearest base 4 and are shipped out from the warehouse 3; and the third is those items that are temporarily stored in the relay base and moved to the nearest base before the submission date. In this disclosure, in order to distinguish the delivery of the items to the customer 1 from the nearest base 4 and the delivery to the customer 1 from the warehouse 3 from one another, the former may be referred to as submission and the latter may be referred to as shipment or transportation. Similarly, for the sake of distinguishing, the movement of the item to the nearest base 4 from the warehouse 3 may be referred to as transportation.

The items temporarily stored in the nearest base 4 are preferred to be items which are purchased frequently or in large amount and items which are requested to be submitted in a short submission deadline. In this embodiment, so-called case-packed items including a plurality of the same items (for example, a case of 24 bottles of beverages or five sets of copy paper each including 500 sheets) are applicable to the items temporarily stored in the nearest base 4.

In this embodiment, even for the items to be temporarily stored in the nearest base 4, the items are shipped out from the warehouse 3 or the relay base and delivered (submitted) to the customer 1 when the items are not in the nearest base 4. As indicated by the dotted line in FIG. 2, the items shipped out from the warehouse 3 may be handled in the nearest base 4 and delivered to the customer 1, or may be directly delivered to the customer 1 in an individual manner. The place for handling the items shipped out from the warehouse 3 may be places other than the nearest base 4 in which the items are temporarily stored. However, when cargo handling is performed in the nearest base 4, the submission of the temporarily stored items and the standard shipping items can be simultaneously performed, and hence the shipping efficiency is enhanced. One business operator collects the items transported and shipped to the nearest base 4 from the warehouse 3 by a plurality of business operators and carries them altogether to the customer 1 from the nearest base 4. In this way, the processing is shared, thereby further enhancing efficiency. When one business operator performs the entire processing, the business operator needs to carry the items to all of the destinations. However, by sharing the processing by but two levels of business operators, each business operator only needs to carry the items to ten destinations when there are 100 destinations, for example.

When there are no items in the nearest base 4, the items are to be shipped out from the warehouse 3, but it is not preferred that the number of the items in the nearest base 4 becomes zero. Therefore, the transportation and shipping management system 2 performs quantity management in the nearest base 4 and the relay base. When the quantity of temporarily stored items becomes less than the predicted demand, item replenishment is performed by transporting the items to the nearest base 4 from the warehouse 3 or the relay base. As a result, stockout can be avoided. The transportation for replenishment can be performed before the actual order, and hence when the transportation is performed can be freely determined to a certain extent. Thus, transportation can be performed so as to avoid time periods in which the amount of distribution is predicted to be large by also performing the demand prediction of the items other than the items to be temporarily stored, that is, the prediction of the amount of distribution. As a result, the amount of distribution can be leveled.

<System Configuration and Processing>

Figure 3:
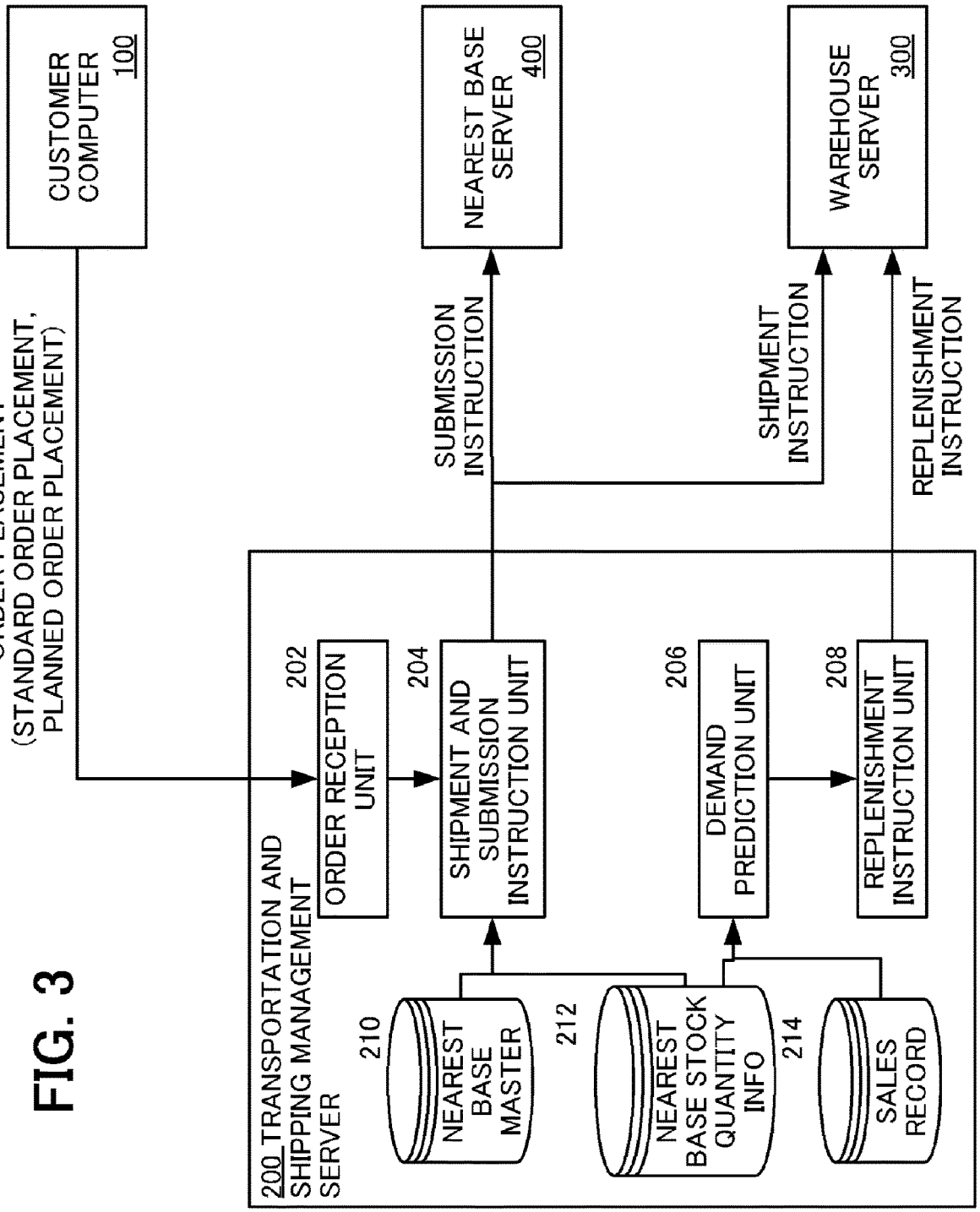
FIG. 3 is a diagram illustrating the configuration of a transportation and shipping management system in Embodiment 1.

The transportation and shipping management system for realizing the distribution model described above is described. FIG. 3 is a diagram illustrating the configuration of the transportation and shipping management system according to this embodiment. The transportation and shipping management system includes a transportation and shipping management server 200, a warehouse server 300, a relay base server, and a nearest base server 400.

The servers are information processing apparatuses (computers) including an arithmetic processor (arithmetic processing unit), a storage device, an input device, an output device, and a communication device, and a function thereof is realized by executing a program stored in the storage device by the arithmetic processor. The servers may be realized by one computer or may be realized by a plurality of computers in cooperation with each other.

The transportation and shipping management server 200 includes an order reception unit 202, a shipment and submission instruction unit 204, a demand prediction unit 206, and a replenishment instruction unit 208 as function units thereof.

<Processing at Time of Order Reception>

The order reception unit 202 receives the order placement for an item from a customer computer 100 used by the customer 1. The customer computer 100 may be a general-purpose computer, or may be a dedicated device only including a button for ordering as a user interface. The order placement includes a standard order placement and a planned order placement (periodic order placement) for delivering a particular item every designated period. Only the standard order placement is considered here first, and the planned order placement is described below. Order information on the standard order placement (hereinafter simply referred to as the order placement) includes the item, the quantity, and the delivery destination and may further include the delivery date and time (delivery time).

The order reception unit 202 may be implemented as a web system that provides a website for online shopping and directly acquire the order information from the customer 1, or may be implemented as a system different from the web system and acquire the order information from the web system.

The shipment and submission instruction unit 204 is a function unit that determines whether to ship out items from the nearest base 4, transport the cargo from the relay base to the nearest base, or ship out the items from the warehouse 3 in accordance with the content of the order from the customer 1 and the stock quantity in the nearest base 4, and gives shipment instructions to the nearest base server 400, the relay base server, or the warehouse server 300.

Figure 4:
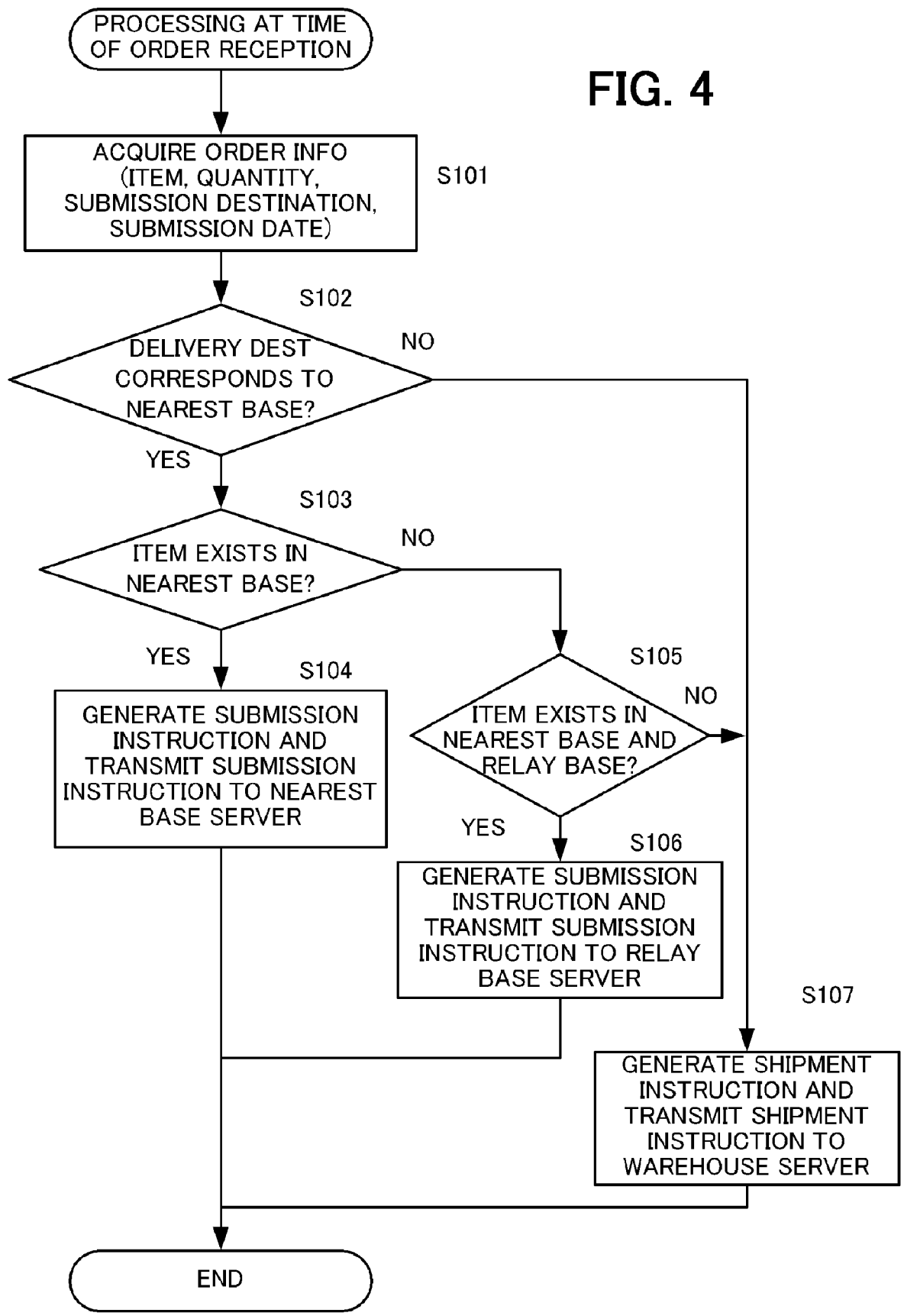
FIG. 4 is a flowchart illustrating the flow of processing at the time of order reception in Embodiment 1.

Processing at the time of order reception is described with reference to the flowchart in FIG. 4. In Step S101, the processing at the time of order reception starts by the order reception unit 202 acquiring the order information of the customer 1.

Next, in Step S102, the shipment and submission instruction unit 204 determines whether the delivery destination of the customer 1 is a delivery destination corresponding to the nearest base with reference to a nearest base master DB 210.

Figure 5:
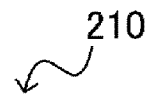
FIG. 5 is a diagram illustrating an example of a nearest base master DB.

As illustrated in FIG. 5, the nearest base master DB 210 stores the nearest base 4, and the customer 1 and its delivery destination address thereof in association with each other. The nearest base 4, and the customer 1 and the delivery destination address are associated with each other by one-to-N correspondence. Although the delivery destination address of the customer 1 is described to be only one here for the sake of simplicity, there may be a plurality of the delivery destination addresses of the customers 1. When there are a plurality of the delivery destination addresses, each address is associated with the nearest base 4.

The shipment and submission instruction unit 204 determines whether the delivery destination included in the order information is associated with the nearest base 4 with reference to the nearest base master DB 210. If the delivery destination is associated with the nearest base 4, it is determined that delivery from the nearest base 4 is possible, and the processing proceeds to Step S103. Meanwhile, if the delivery destination is not associated with the nearest base 4, it is determined that delivery from the nearest base 4 is not possible, and the processing proceeds to Step S107.

Figure 6:
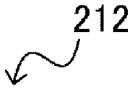
FIG. 6 is a diagram illustrating an example of an stock quantity master DB.

In Step S103, the shipment and submission instruction unit 204 determines whether there is a quantity of the item corresponding to the order from the customer 1 in the nearest base 4 with reference to a nearest base stock quantity DB 212. As illustrated in FIG. 6, the nearest base stock quantity DB 212 stores the stock quantity for each nearest base 4 and each item. The stock quantity in the nearest base stock quantity DB 212 is reduced in accordance with the submission instruction from the shipment and submission instruction unit 204, and is increased in accordance with the item replenishment from the warehouse 3. The stock quantity may be updated in accordance with the transmission of the stock quantity information from the nearest base server 400.

When the shipment and submission instruction unit 204 determines that the stock quantity of the ordered items in the nearest base 4 corresponding to the delivery destination is equal to or more than the ordered quantity, the processing proceeds to Step S104. When the stock quantity is less than the ordered quantity, the processing proceeds to Step S105.

In Step S104, the shipment and submission instruction unit 204 generates a submission instruction for submitting the items to the delivery destination from the nearest base 4, and transmits the submission instruction to the nearest base server 400. The submission instruction includes the item, the quantity, the delivery destination address, the delivery date and time, and slip printing information for printing slips such as an invoice and a tag label. When the nearest base server 400 receives the submission instruction, the nearest base server 400 notifies a delivery person of the reception of the submission instruction. The delivery person delivers the items to the customer at the delivery destination address by picking up the items and printing the slip in accordance with the submission instruction information. The distance from the nearest base 4 to the delivery destination is short, and hence the items may be directly delivered without being packaged. The items may be delivered without the tag label.

In Step S105, the shipment and submission instruction unit 204 determines whether the total number of the ordered items in the nearest base 4 corresponding to the delivery destination and the relay base 6 upstream of the nearest base 4 is equal to or more than the number ordered from the customer 1. The quantity of the items in the relay base 6 can be determined by referring to a relay base stock quantity DB (not shown) similar to the nearest base stock quantity DB 212. When the total quantity of the item in the nearest base 4 and the relay base 6 is equal to or more than the ordered quantity, the processing proceeds to Step S106, and otherwise the processing proceeds to Step S107.

In Step S106, the shipment and submission instruction unit 204 generates a submission instruction for submitting the item to the delivery destination from the relay base 6 and the nearest base 4, and transmits the submission instruction to the relay base server and the nearest base server 400. The item submission from the relay base 6 and the nearest base 4 may be performed separately or performed all together at the nearest base 4.

In Step S107, the shipment and submission instruction unit 204 generates a shipment instruction for shipping out the items from the warehouse 3 to the delivery destination, and transmits the shipment instruction to the warehouse server 300. The shipment instruction includes the item, the quantity, the delivery destination address, the delivery date and time, and a slip printing information for printing a slip such as the invoice and the tag label. In the warehouse 3, the items are picked up, the invoice is printed, packaging is performed, and loading processing onto a delivery vehicle is performed, for example, in accordance with the shipment instruction, and the item is delivered to the customer at the delivery destination address.

<Replenishment Processing>

The demand prediction unit 206 and the replenishment instruction unit 208 of the transportation and shipping management server 200 are function units used for replenishing the items in the nearest base 4. The demand prediction unit 206 predicts the demand for the items for each nearest base 4, and the replenishment instruction unit 208 instructs the warehouse server 300 to replenish the items to the nearest base 4 when the nearest base 4 does not have a sufficient quantity of items in accordance with the predicted demand amount. A more detailed description is made below with reference to a flowchart in FIG. 7A.

Figure 7A:
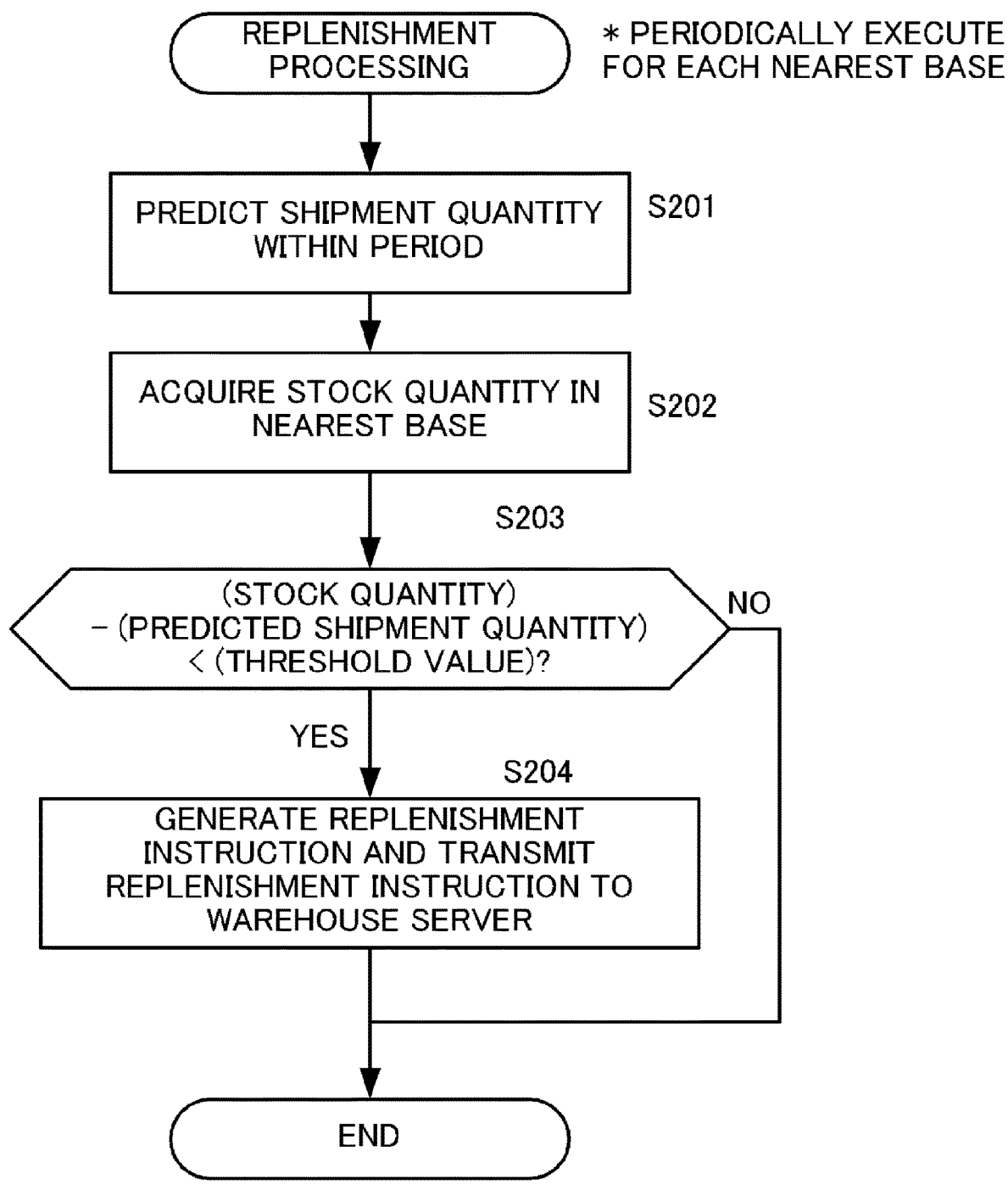
FIG. 7A and FIG. 7B are flowcharts illustrating the flow of replenishment processing of an item to a nearest base in Embodiment 1 and a modified example thereof.

Replenishment processing illustrated in FIG. 7A is periodically executed for each nearest base and each item. The intervals of the execution may be, for example, in accordance with the intervals of the item shipment from the warehouse 3, or may be more or less frequent than the intervals.

In Step S201, the demand prediction unit 206 predicts the shipment quantity within a coming designated period. In this embodiment, the designated period (the period of the demand prediction) is the same as the execution interval of the replenishment processing. The prediction of the shipment quantity can be performed by predicting the shipment quantity for each customer corresponding to the nearest base 4 and setting the quantity to be the total number, for example. The demand prediction unit 206 can predict the item shipment amount for each customer by referring to a sales performance DB 214 storing the sales performance of the past. At this time, the accuracy is improved when the shipment amount is predicted while considering information on the day of the week, the season, the weather, whether there is a sale, and an event, for example.

The demand prediction unit 206 acquires the stock quantity in the nearest base 4 by referring to the nearest base stock quantity DB 212 in Step S202, and determines whether a value obtained by subtracting the predicted shipment quantity from the stock quantity is less than a threshold value in Step S203. The threshold value may be such a value that stock-out is likely to occur in the abovementioned predetermined period if the stock quantity becomes less than the value. The threshold value is desired to be set for each item. The threshold values for the items may be the same for all of the nearest bases or may be different for each of the nearest bases. Further, the threshold values for the items may be different values depending on the time period even for the same item and the same nearest base.

When the value obtained by subtracting the predicted shipment quantity from the stock quantity is equal to or more than the threshold value in Step S203, the replenishment is unnecessary, and hence the processing ends as is. Meanwhile, when the value obtained by subtracting the predicted shipment quantity from the stock quantity is less than the threshold value, the processing proceeds to Step S204. In Step S204, the replenishment instruction unit 208 generates a replenishment instruction for transporting the items from the warehouse 3 or the relay base 6 to the nearest base 4, and transmits the replenishment instruction to the warehouse server 300 or the relay base server. The replenishment instruction includes information on the item, the quantity, the nearest base that is the replenishment destination, and the like. The replenishment quantity may be determined as a quantity that causes the temporarily stored quantity after the replenishment be a predetermined quantity or more, for example. When the warehouse server 300 receives the replenishment instruction, the warehouse server 300 notifies a shipping staff of the reception of the replenishment instruction. The shipping staff takes out the items from the warehouse 3 or the relay base 6 and transports the items to the nearest base 4 in accordance with the replenishment instruction. In this embodiment, the transportation for the item replenishment is performed in a state in which the items are loaded on a roll-box pallet for transportation, and the items are temporarily stored in the nearest base 4 with the roll-box pallet. When there is an empty roll-box pallet in the nearest base 4, the shipping staff collects the empty roll-box pallet at this time.

The transportation of the items from the warehouse 3 or the relay base 6 to the nearest base 4 performed in advance does not necessarily need to be performed at once, and any way is possible as long as the necessary quantity is gathered in the nearest base before the submission date to the customer 1.

Figure 12:
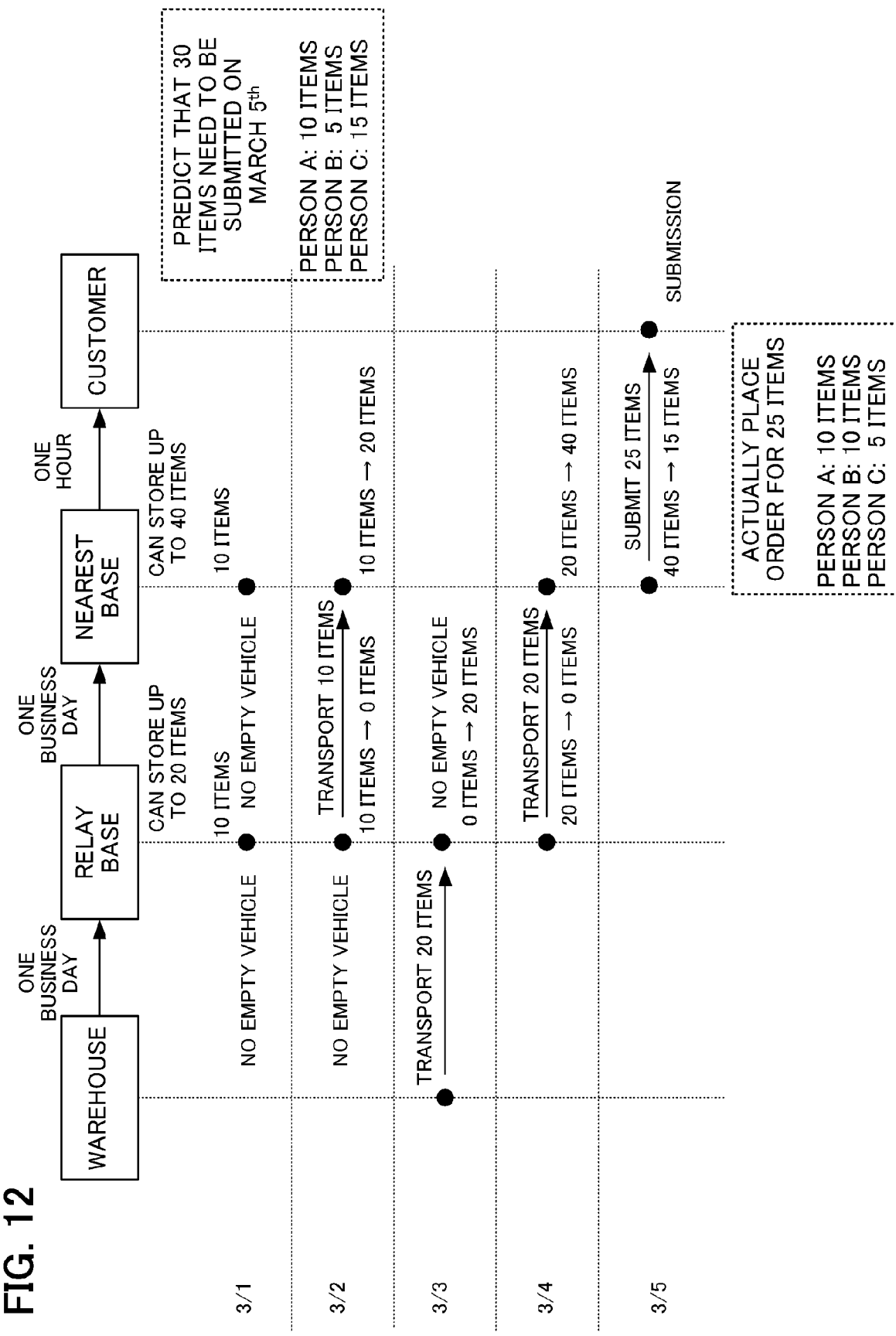
FIG. 12 is a diagram illustrating a specific example of the replenishment processing of the item in Embodiment 1.

The replenishment processing of the items at the nearest base 4 is specifically described with reference to FIG. 12. FIG. 12 is a diagram illustrating the movement of the items between the warehouse 3, the relay base 6, the nearest base 4, and the customer 1. Here, it is assumed that it takes the time of one business day for the items to be transported to the relay base 6 from the warehouse 3 and the items to be transported to the nearest base 4 from the relay base 6, and it takes the time of one hour for the items to be transported (submitted) to the customer 1 from the nearest base 4.

In this example, in the shipment amount prediction of the items performed at the time point of March 1st, it is predicted that a total number of 30 items needs to be shipped out and delivered on March 5th. Specifically, it is predicted that 10 items are for a person A, five items are for a person B, and 15 items are for a person C, and the total number of items is 30 on March 5th. Here, the people A, B, and C are all associated with the same nearest base 4.

At the time point, there are only 10 items in the nearest base 4, and there are also only 10 items in the relay base 6. Therefore, it is understood that 10 items in the relay base 6 need to be moved to the nearest base 4, and at least 10 items or about 20 items in consideration of safety need to be transported to the nearest base 4 from the warehouse 3.

The items only need to be present in the nearest base 4 at the time point of March 5th, and hence the replenishment instruction unit 208 of the transportation and shipping management server 200 formulates a replenishment plan in consideration of the room in the transportation capacity. In this example, on March 1st, there are no empty vehicles for both of the transportation to the relay base 6 from the warehouse 3 and the transportation to the nearest base 4 from the relay base 6, and hence the items are not transported. On March 2nd, there is an empty vehicle for the transportation to the nearest base 4 from the relay base 6, and hence the 10 items in relay base 6 are moved to the nearest base 4. As a result, the number of items in the nearest base 4 becomes 20, and the number of items in the relay base 6 becomes zero. On March 3rd, there is an empty vehicle for the transportation to the relay base 6 from the warehouse 3, and hence the 20 items in the warehouse 3 are moved to the relay base 6. The 20 items are designated in consideration of the upper limit of the number of items that can be stored in the relay base 6. As a result, the number of items in the relay base 6 becomes 20. On March 4th, there is an empty vehicle for the transportation to the nearest base 4 from the relay base 6, and hence 20 items are moved to the nearest base 4 from the relay base 6. As a result, the number of items in the nearest base 4 becomes 40, and there are 40 items obtained by adding a safety factor to 30 items that is a predicted shipment amount on March 5th.

In this example, the shipment quantity (ordered quantity) on March 5th is actually 25 items (10 items for the person A, 10 items for the person B, and five items for the person C). Therefore, on March 5th, the items, that is, 10 items, 10 items, and 5 items addressed to the person A, the person B, and the person C, respectively, are submitted from the nearest base 4. As described above, when the actual order placement is performed, the items are transported to the nearest base 4 in advance, and hence the items can be submitted in a short time (one hour in this example) from the order placement.

As described above, the efficiency of the transportation and the shipping can be enhanced also from the viewpoint of transporting the items in advance at the timing at which the amount of distribution can be leveled.

In this example, the items are temporarily stored in the relay base 6, but the items may be transported to the nearest base 4 from the warehouse 3 without passing through the relay base 6, or the items may be transported to the nearest base 4 from the warehouse 3 without temporarily storing the items in the relay base 6.

Advantageous Effects of this Embodiment

In this embodiment, in a distribution model in which the same items are shipped to a plurality of carrying destinations from a shipment source, those items are aggregated to bases (the nearest base and the relay base) on the transportation and shipping path. Further, the amount of items required to transport is determined using a prediction based on past order records and a pre-order placement information, and the items are transported at the timing at which the amount of distribution can be leveled on the basis of prediction based on past performance to aggregate in the nearest base. As described above, the realized distribution model is more efficient as compared to existing models that perform transportation and shipping for individual shipping instructions. The time needed from the request until to delivery completion can be significantly shortened because the shipping is performed from the nearest base.

According to this embodiment, a large number of the nearest bases 4 is provided near the customers 1, and the items are temporarily stored and submitted from the nearest bases 4. In addition, the items are shipped from the warehouse 3 by using the nearest bases 4 as cargo handling places. As a result, the item transportation to the nearest base 4 from the warehouse 3 and the delivery to the customer 1 from the nearest base 4 can be separated and be performed by different business operators. As a result, achieved are an effect of avoiding the adverse influence on the existing distribution network and an effect of increasing business operators entering a last-mile delivery to the customer 1 from the nearest base 4.

By transporting the items in advance to the nearest base near the customer (delivery destination) on the basis of the demand prediction, only a short distance delivery to the delivery destination from the nearest base needs to be performed at the time point of an order placement from the customer. Therefore, the time from the order placement to the submission can be extremely short. The items in the nearest base are replenished on the basis of the demand prediction, and hence the possibility of stockout can be minimized. Even when there is a stockout, shipment from the warehouse is possible, and hence the order from the customer can be processed as appropriate.

According to this embodiment, the distance from the nearest base 4 to the customer (delivery destination) becomes short, and hence variation in delivery time can be suppressed and the delivery can be performed on the time as scheduled. This leads to the reduction of redelivery, and the efficiency is improved. Even when redelivery is to be performed, the labor in accordance with the redelivery can be extremely reduced as compared to before because the distance of delivery is short.

In the distribution model according to this embodiment, the distance of the delivery to the customer 1 from the nearest base 4 is a short distance by which delivery can be performed on foot, and hence the entry barrier for business operators that deliver the items to the customer 1 from the nearest base 4 is lowered. That is, more business operators can easily enter last-mile shipping. As a result, the distribution supplying capacity is easily increased. Even when the entire shipping is performed by the same business operator, the last 0 mile delivery can be performed by a less-experienced delivery person, and hence the number of the delivery people are easily increased.

Modified Example 1

In the description above, the transportation (replenishment) of the items to the nearest base 4 from the warehouse 3 is described to be performed separately from the item shipment to the customer 1 from the warehouse 3. However, when the shipping to the customer 1 from the warehouse 3 is performed via the nearest base 4, it is efficient to perform each cargo transportation jointly.

When the items are transported from the warehouse 3 without using an existing distribution network, it is assumed that the requested transportation amount greatly varies daily. For the standard shipment items, the transportation date is difficult to be shifted because the delivery date (submission date) is designated, but the transportation for replenishment to the nearest base 4 can be performed ahead of schedule. Thus, in this modified example, the variation in the daily transportation amount can be suppressed by shifting the execution timing of the item replenishment to the nearest base 4, as appropriate. As a result, the transportation availability ratio is enhanced and the shipping efficiency is improved.

Figure 7B:
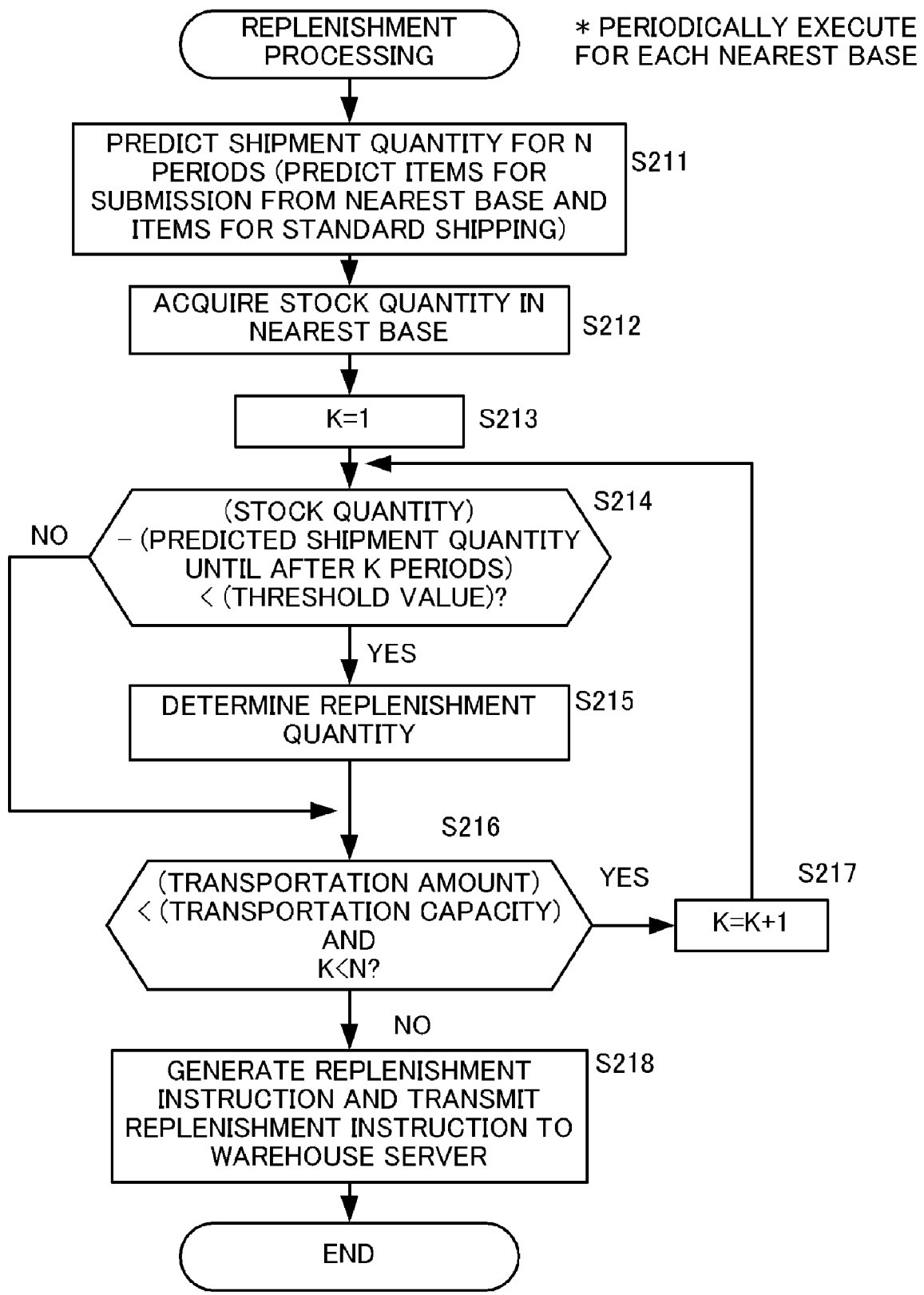

The replenishment processing for executing the above-mentioned processing is illustrated in FIG. 7B. The replenishment processing in FIG. 7B is periodically executed for each nearest base 4.

Step S211 is basically similar to Step S201 in FIG. 7A, but not only the demand for the items stored in the nearest base 4 is predicted but also the demand for the items for standard shipping (in other words, items stored in the warehouse 3) is performed, is predicted. The target period for the demand prediction is longer than the execution interval of the replenishment transportation and shipment (N periods. N>1. One period equals to the execution interval). For example, when shipment from the warehouse 3 is performed once a day, the demand until 7 days after is predicted for each day, for example (N=7).

The processing of acquiring the stock quantity in the nearest base in Step S212 is performed in a similar manner as in Step S202.

In the loop processing from Step S213 to Step S217, first, a variable K is set to 1 in Step S213, and the necessity of replenishment is determined for the first replenishment transportation and shipment period. In Step S214, after K (=1) period (for example, after one day), it is checked whether (the temporarily stored quantity)−(the predicted shipment quantity) is less than a threshold value, and it is determined that the replenishment of the items is performed for the items that are less than the threshold value (S215). The replenishment quantity may be a predetermined value, or may be determined in consideration of the demand amount during the period. At the time point, when the total number of the transportation amount for replenishment and the transportation amount for the standard shipment is not exceeding the transportation capacity and the variable K is less than N (S216-YES), the variable K is incremented by 1 (S217) and the processing from Step S214 is performed. When K>1, the "stock quantity" in the determination in Step S214 is calculated by including not only the stock quantity currently in the nearest base 4 but also the replenishment quantity until a time period K−1.

By performing the processing as above, the items having a high replenishment priority can be reliably replenished, and the items that may be replenished in a later period can be replenished in advance when there is an extra transportation amount. That is, the replenishment quantity decreases in the times in which the standard shipping is performed many times and the replenishment quantity increases in the times in which the standard shipping is not performed so much. As a result, the transportation amount can be leveled as a whole.

Modified Example 2

In the description above, the demand prediction is performed on the basis of only the sales record, but the demand prediction can be performed in consideration of other information. For example, it can be conceived to perform the demand prediction on the basis of the planned order placement. The planned order placement is an order placement form in which the customer repeatedly purchases the same items in a periodical manner. In the planned order placement, the approximate delivery date (submission date) is designated, but the delivery date is not determined until immediately before the delivery date. For example, it is registered that the items are delivered on the 20th day of every month, and when it is the time immediately before (for example, three days before) the delivery date, the customer receives an inquiry regarding a delivery date confirmation, and the delivery date can be shifted or the order on the month itself can be cancelled. The planned order placement is also referred to as a periodic order placement, a periodic delivery, or the like.

The order reception unit 202 of the transportation and shipping management server 200 is formed to be also able to acquire planned order placement information on order placements for which delivery date is not determined as above and order placement determination information for determining the delivery date of the planned order placement. In the planned order placement information, information on the item, the quantity, the delivery destination, the purchase interval, the next delivery scheduled date, and the like is included. The demand prediction unit 206 predicts the shipment amount in the coming designated period by also considering the planned order placement information in addition to the sales performance of the past. The planned order placement is an undetermined order, but is likely to lead to an actual purchase, and hence the shipment quantity in a relatively long span can be accurately predicted by considering the planned order placement information.

The processing in this modified example may be executed in combination with Modified Example 1.

Modified Example 3

In the description above, it is determined whether the item replenishment is to be performed by performing the demand prediction and comparing the demand quantity and the temporarily stored quantity to each other. However, the replenishment may be performed when the stock quantity in the nearest base 4 simply becomes less than the threshold value without performing the demand prediction. In this case, the probability of the item stockout in the nearest base 4 increases, but the other effects described in the description above can be achieved.

At this time, as with Modified Example 1, it is also preferred that the item replenishment quantity be determined in consideration of the transportation capacity. For example, a plurality of threshold values for the stock quantity are provided for one item, and the items less than a smaller threshold value are set to have a higher replenishment priority. The replenishment quantity is determined in the order for the items having a higher replenishment priority, and the determination is performed until the total number of the transportation amount for replenishment and the transportation amount for the standard shipping reaches the transportation capacity. When determination is performed as described above, the items having a high replenishment priority can be replenished on a priority basis, and transportation can be performed by the amount of the shipping capacity. The replenishment quantity decreases in times in which the standard shipping is performed many times, and the replenishment quantity increases in times in which the standard shipping is not performed so much. As a result, the transportation amount can be leveled as a whole.

Modified Example 4

In the abovementioned embodiment, the management of the stock quantity in the nearest base 4 is managed as the difference between the transportation quantity and the submission quantity. In the management as above, there may be a difference between the stock quantity on the data base and the actual stock quantity. Thus, in this modified example, a system in which the stock quantity in the nearest base 4 can be constantly grasped in an accurate manner is introduced.

Figure 8:
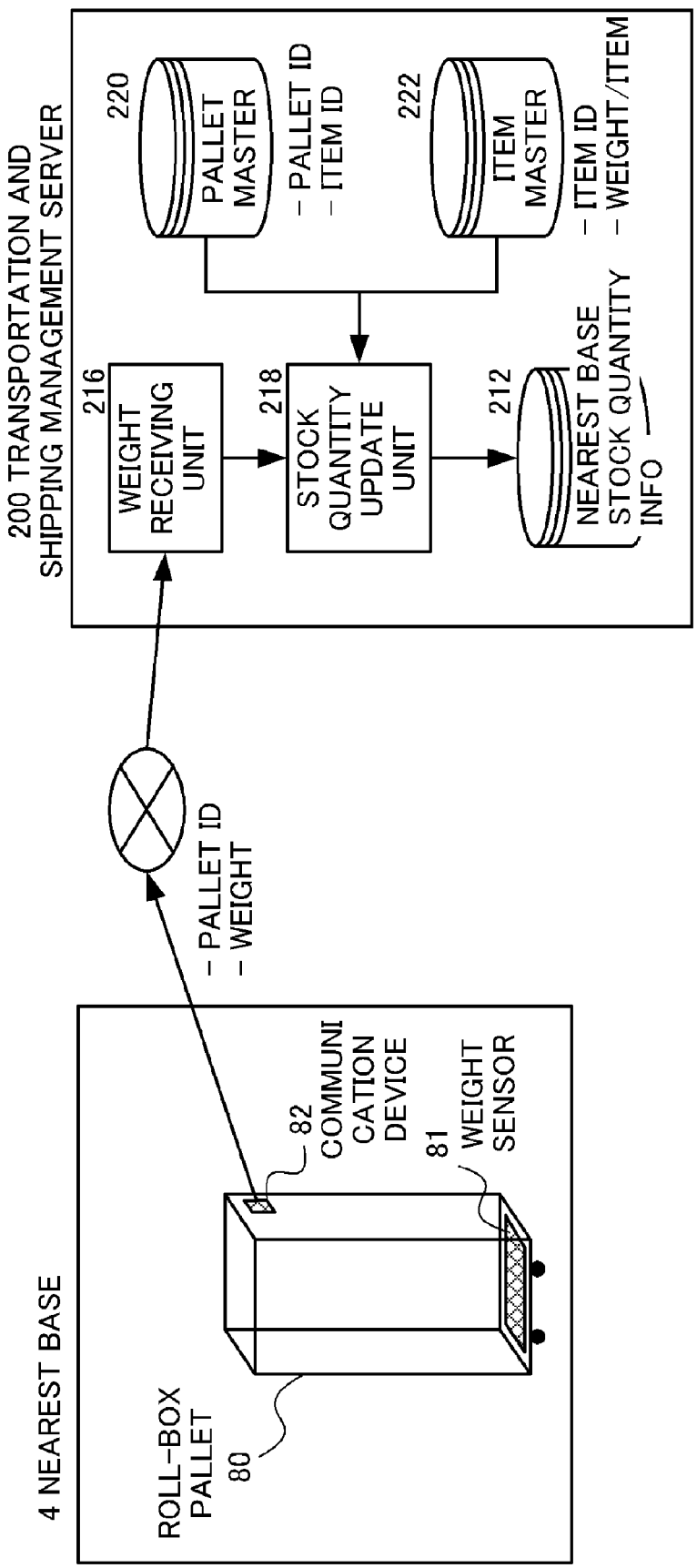
FIG. 8 is a diagram illustrating the stock quantity management and the replenishment processing in the modified example of Embodiment 1.

FIG. 8 is a block diagram illustrating a system of the quantity management in the nearest base 4 in this modified example. As described above, the items are transported to the nearest base 4 in a state in which the items are loaded on a roll-box pallet 80 for transportation. The roll-box pallet 80 in this modified example includes a weight sensor 81 on the bottom surface portion, and further includes a communication device 82. The communication device 82 may be a freely-selected communication device such as communication devices for 3G, LTE, Bluetooth (registered trademark), and WiFi as long as the communication device can eventually communicate with the transportation and shipping management server 200.

The roll-box pallet 80 transmits weight information including the sensor reading value of the weight sensor 81 and the pallet ID of the roll-box pallet 80 to the transportation and shipping management server 200 via the communication device 82. The communication device 82 may directly communicate with the transportation and shipping management server 200, or may communicate with the transportation and shipping management server 200 via the nearest base server 400 or other apparatuses. The measurement by the weight sensor 81 and the transmission of the weight information by the communication device 82 are periodically performed, for example.

The transportation and shipping management server 200 further includes a weight receiving unit 216 and an stock quantity update unit 218 in addition to the configuration illustrated in FIG. 3. The weight receiving unit 216 receives the weight information including the reading value of the weight sensor and the pallet ID from the roll-box pallet 80. The stock quantity update unit 218 updates the nearest base stock quantity DB 212 on the basis of the weight information received by the weight receiving unit 216, a pallet master DB 220, and an item master DB 222. In the pallet master DB 220, the pallet ID and the item ID of the item loaded on the pallet are stored in association with each other (only one item is loaded on one pallet). In the item master DB 222, the item ID and the weight for one item thereof are stored in association with each other. The stock quantity update unit 218 calculates the number of the items loaded on the pallet corresponding to the weight information and updates the nearest base stock quantity DB 212 with reference to those DBs.

As described above, by using the weight sensor 81 of the roll-box pallet 80, the stock quantity in the nearest base 4 can be constantly grasped in an accurate manner.

Embodiment 2

In Embodiment 1, the items are assumed to be big to a certain degree such as case-packed items. However, this embodiment proposes a selling and shipping method appropriate for purchasing small items in a unit of one item (separately). For the separate items assumed in this embodiment, pens, sticky notes, and dry-cell batteries can be exemplified, for example, but the present invention is not limited thereto as a matter of course.

The selling and the shipping of the separate items are mainly described below, but this embodiment can be executed in combination with Embodiment 1. That is, this embodiment can be applied to both of the case-packed items and the separate items, as appropriate.

FIG. 9A is a diagram illustrating a distribution model in this embodiment. In this embodiment, items are stored in a cartridge-type container 91 (hereinafter referred to as the cartridge 91), and the entire cartridge 91 is placed in a customer office. In the customer office, a rack for inserting the cartridge 91 is provided. FIG. 9B is a view for illustrating the cartridge 91. The cartridge 91 includes a box body 92 and a drawer 93. A weight sensor 94 is provided on the bottom surface portion of the drawer 93, and a communication device 95 is provided on the box body 92. The reading value obtained by the weight sensor 94 can be transmitted to the transportation and shipping management server 200 via the communication device 95.

In this embodiment, the customer 1 can take out the item from the cartridge 91 and use the item without performing the purchase processing in advance. The sensor reading value of the weight sensor 94 of the cartridge 91 is periodically transmitted to the transportation and shipping management server 200. The transportation and shipping management server 200 determines that the submission of the items is necessary when the weight becomes less than a threshold value, and provides a submission instruction for the items to the nearest base server 400.

When the nearest base server 400 receives the submission instruction, the delivery person at the nearest base 4 delivers a cartridge 91 full of the items to the customer 1. The shipping processing itself is similar to that in Embodiment 1, but the delivery person replaces the entire cartridge in this embodiment. That is, the cartridge that has been at the place of the customer 1 is collected, and a new cartridge is placed at the place of the customer 1. The reading value of the weight sensor of the collected cartridge and the reading value of the weight sensor of the new cartridge are transmitted to the transportation and shipping management server 200, and the billing processing is executed for the customer 1 on the basis of the difference between the weights.

Also in this embodiment, as with Embodiment 1, the quantity management of the items (cartridges) in the nearest base 4 is performed, and replenishment from the warehouse 3 or the relay base to the nearest base 4 is performed when the items in the nearest base quantity becomes less.

This embodiment can be understood as a "household medicine" type selling (selling by distribution) in which orders are not placed, but it can be understood that the order for the items or the delivery instruction for the cartridge 91 is given at the time point at which the reading value of the weight sensor in the cartridge 91 at the place of the customer 1 becomes less than the threshold value.

Figure 10:
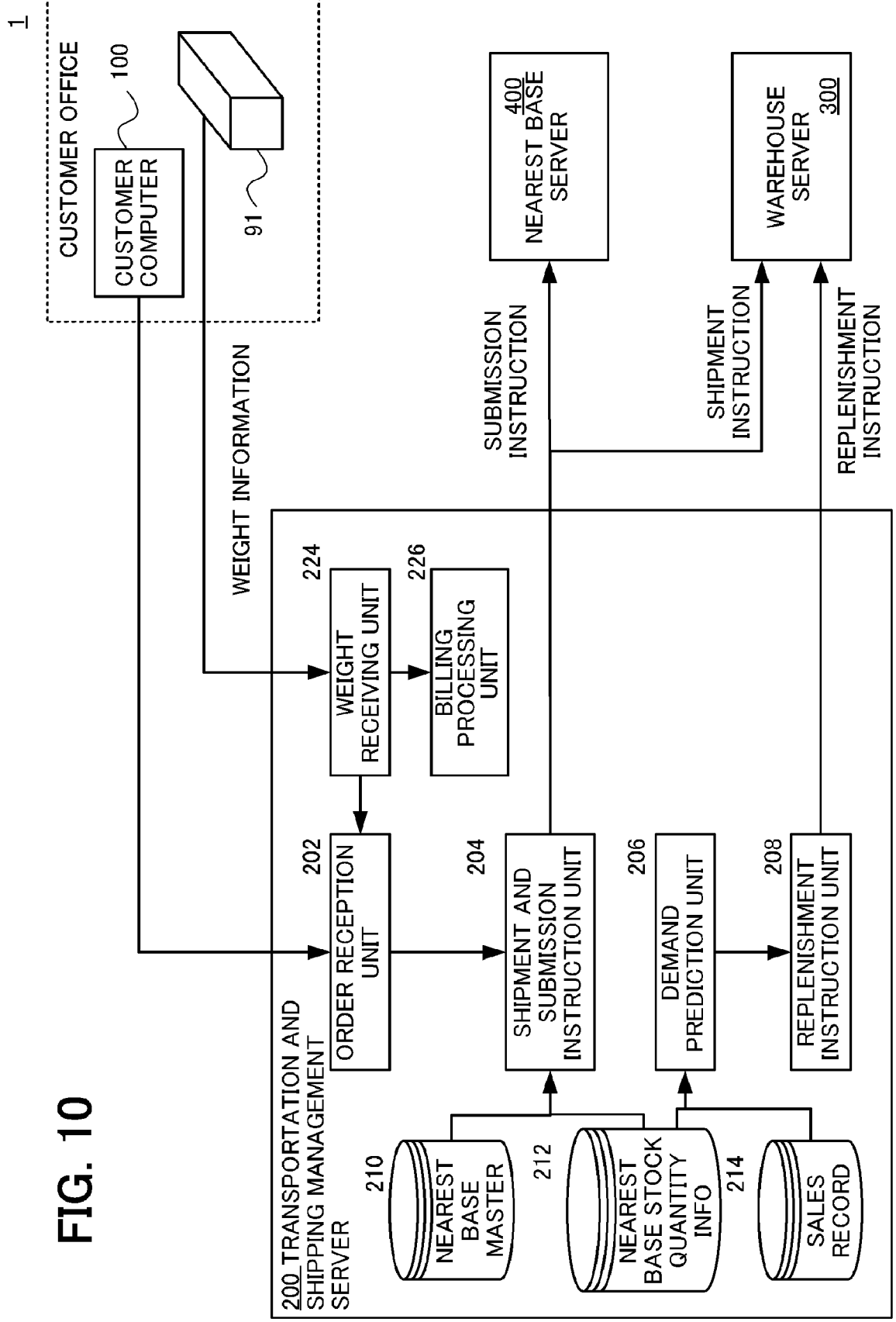
FIG. 10 is a diagram illustrating the configuration of a transportation and shipping management system in Embodiment 2.

FIG. 10 is a diagram illustrating the configuration of a transportation and shipping management system for realizing this embodiment. The configuration is basically similar to that of Embodiment 1, but is different in that the transportation and shipping management server 200 includes a weight receiving unit 224 and receives the weight information from the cartridge 91 at the customer office, and that the shipment and the submission of the items are determined on the basis of the weight information.

Figure 11:
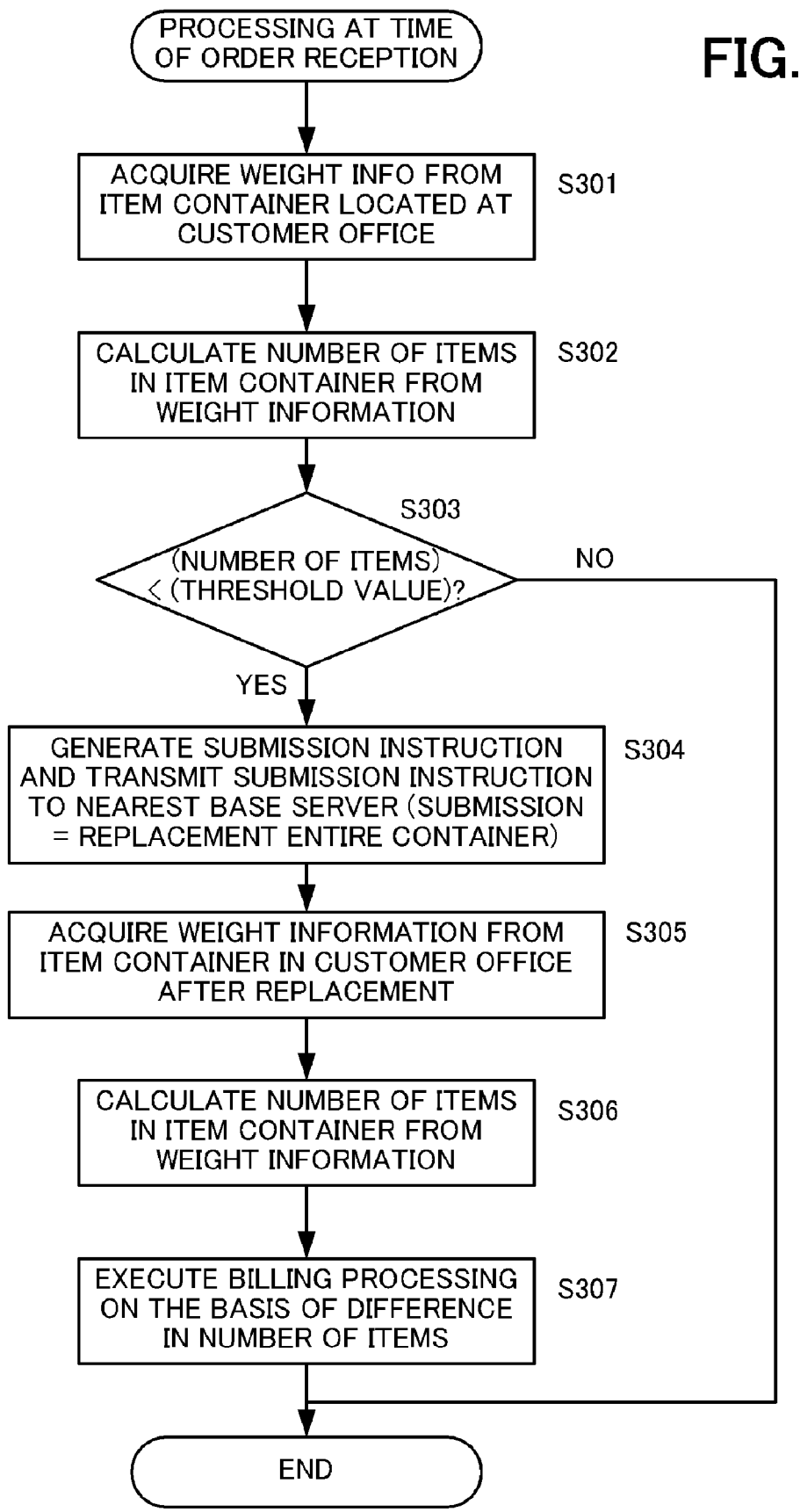
FIG. 11 is a flowchart illustrating the flow of processing at the time of order reception in Embodiment 2.

FIG. 11 is a flowchart illustrating the flow of shipping processing in this embodiment. The processing starts at the timing at which the weight receiving unit 224 receives the weight information from the cartridge 91 at the place of the customer 1 in Step S301. In Step S302, the weight receiving unit 226 calculates the number of the items in the cartridge 91 from the weight information. The calculation can be performed by referring to the weight for one item stored in the cartridge 91.

In Step S303, the order reception unit 202 determines whether the number of the items in the cartridge 91 is less than a threshold value. The threshold value may be determined, as appropriate, in accordance with the items, and is more preferred to be a value in accordance with the item consumption pace of the customer. When the number of the items is equal to or more than the threshold value, it is determined that there is a sufficient amount of the items at the place of the customer 1 and the processing ends. Meanwhile, when the number of the items is less than the threshold value, it is determined that replenishment of the items is necessary at the place of the customer 1. In this case, the order reception unit 202 considers that the order for delivering the cartridge 91 to the place of the customer 1 is received, and performs the processing similar to that performed when the order information indicating that the cartridge 91 is to be delivered to the customer 1 (delivery destination) is acquired.

In Step S304, the shipment and submission instruction unit 204 submits one (one unit of) cartridge 91 to the customer 1, generates a submission instruction instructing the cartridge 91 at the delivery destination to be collected, and transmits the submission instruction to the nearest base server 400. The delivery person at the nearest base 4 takes out the new cartridge 91 from the nearest base 4, delivers the new cartridge 91 to the customer 1, and replaces the entire cartridge. Although not illustrated in FIG. 11, as with Embodiment 1 (Step S102 to Step S105 in FIG. 4), it is determined whether the delivery destination of the customer 1 corresponds to the nearest base 4 and whether there is the cartridge 91 in the nearest base 4 also in this embodiment. When the delivery destination is corresponding to the nearest base 4 and the cartridge 91 is in the nearest base 4, the submission instruction is transmitted to the nearest base server 400, and the shipment instruction is transmitted to the warehouse server 300 otherwise.

In Step S305, after the cartridge 91 is replaced, the weight information is acquired from the cartridge 91 that has been at the place of the customer 1. The weight information at the time of the replacement may be transmitted from the cartridge 91 when the delivery person operates the cartridge 91 when the cartridge is replaced, for example.

In Step S306, the weight receiving unit 226 calculates the number of the items from the received weight as in Step S302. In Step S307, a billing processing unit 228 performs the billing processing on the basis of the difference between the number of the submitted items in the cartridge 91 and the number of the collected items in the cartridge 91. The billing processing unit 228 may execute the entire billing processing by itself, but may also be formed so as to request a billing server that is separately provided to execute the billing processing.

According to this embodiment, the customer 1 does not need to expressly place the order for the separate items, the state in which the items are constantly at the place of the customer 1 can be maintained, and the items can be used as much as desired. The labor for selling and shipping separate items one by one is omitted, and hence efficiency is obtained also for the selling and shipping carriers.

Not all of the separate items need to be marketed with use of the abovementioned cartridge, and the items may be delivered from the nearest base 4 (the warehouse 3 when there are no items in the nearest base 4) in accordance with the order placement via a selling site as with Embodiment 1 even for separate items.

The transportation and shipping management server 200 replaces the cartridge 91 on the basis of the reading value of the weight sensor transmitted from the inside of the cartridge 91 in this embodiment, but the customer 1 may expressly transmit a replacement request for the cartridge 91 (a delivery request for the container). For example, the customer 1 may transmit the replacement request by accessing to the transportation and shipping management server 200 with use of a computer. Alternatively, the cartridge 91 may include a button as a user interface, and the replacement request may be transmitted to the transportation and shipping management server 200 from the communication device when the customer 1 presses the button. According to the method as above, a similar effect as that described above can be obtained without providing the weight sensor in the cartridge 91.

This embodiment is assumed to be executed in combination with Embodiment 1 related to the selling and the shipping of case-packed items and the modified examples thereof, but it is also possible to execute only this embodiment in an independent manner without performing the selling and the shipping of the case-packed items.

<Recoding Medium Readable by Computer>

A program that causes a computer and other machines and apparatuses (hereinafter a computer and the like) to realize a management tool, an OS, and the like for performing the setting of the abovementioned server can be recorded on a recoding medium readable by the computer and the like. By causing the computer and the like to read and execute the program of the recoding medium, the computer and the like can provide the function thereof.

The recoding medium readable by the computer and the like is herein a recoding medium that can accumulate information such as data and program by an electrical, magnetic, optical, mechanical, or chemical action and is readable from the computer and the like. Out of the recording media as above, recording media that can be removed from the computer and the like include a flexible disk, a magneto-optical disk, a CD-ROM, a CD-R/W, a DVD, a Blu-ray disc, a DAT, an 8 mm tape, a memory card such as a flash memory. Recoding media fixed to the computer and the like include a hard disk and a ROM, for example.

What is claimed is:

1. A transportation and shipping management system for managing a selling system for shipping out an item from a warehouse or a nearest base associated with a delivery destination in accordance with the delivery destination,
the transportation and shipping management system comprising an instruction unit configured:
to, before receiving an order placement for an item from a customer, transmit, to a warehouse server associated with the warehouse or a relay base server associated with a relay base, a transportation instruction for transporting the item to the nearest base from the warehouse or the relay base, and
to, after receiving the order placement for the item from the customer, transmit, to a nearest base server associated with the nearest base, a submission instruction for submitting the ordered item to the customer;
wherein the item is present in plurality and at least a part of the items is stored in plurality in a first container;
wherein the submission instruction includes an instruction for carrying the first container, which is temporarily stored in the nearest base and in which the plurality of items are stored, to the delivery destination and collecting a second container located at the delivery destination; and
wherein the transportation and shipping management system further comprises a server comprising a billing processing unit configured to automatically generate billing information on the basis of a difference between a reading value received from a weight sensor of the first container transmitted via a communication device of the first container, and a reading value received from a weight sensor of the second container transmitted via a communication device of the second container.

2. The transportation and shipping management system according to claim 1, further comprising:
   a storage unit configured to store quantity information of the item temporarily stored in the nearest base;
   an order reception unit configured to acquire order placement information including an item identifier, a quantity, and a delivery destination; and
   a determination unit configured to determine whether a condition that the delivery destination included in the order placement information is associated with the nearest base and that the item indicated by the item identifier is present in the nearest base in the quantity or more is satisfied,
   wherein the instruction unit transmits the submission instruction to the nearest base server when the condition is satisfied, and transmits a shipment instruction corresponding to the order placement information to the warehouse server when the condition is not satisfied.

3. The transportation and shipping management system according to claim 2, further comprising a prediction unit configured to predict a demand quantity of the item for a delivery destination associated with the nearest base,
   wherein the instruction unit transmits, to the warehouse server, the transportation instruction for transporting the item to the nearest base from the warehouse when a difference between the predicted demand quantity of the item and the quantity of the item temporarily stored in the nearest base is less than a threshold value.

4. The transportation and shipping management system according to claim 3, wherein the instruction unit (A) determines a transportation quantity of the item to the nearest base from the warehouse in consideration of (A1) a transportation capacity, and (A2) a total number of a transportation amount in accordance with replenishment of the item to the nearest base from the warehouse and a transportation amount in accordance with shipment of the item to the customer from the warehouse, and (B) transmits the transportation quantity of the item by including the transportation quantity of the item in the transportation instruction.

5. The transportation and shipping management system according to claim 2, further comprising a prediction unit configured to predict a demand quantity of the item for a delivery destination associated with the nearest base,
   wherein the storage unit also stores quantity information of the item temporarily stored in the relay base; and
   wherein the instruction unit transmits, to the relay base server, the transportation instruction for transporting the item to the nearest base when a total number of a quantity of the item temporarily stored in the nearest base and a quantity of the item temporarily stored in the relay base is equal to or more than the quantity included in the order placement information even when the condition is not satisfied.

6. The transportation and shipping management system according to claim 5, wherein the instruction unit transmits, to the warehouse server or the relay base server, the transportation instruction for transporting the item to the nearest base from the warehouse or the relay base when a difference between a predicted demand quantity of the item and a total number of the quantity of the item temporarily stored in the nearest base and the quantity of the item temporarily stored in the relay base is less than a threshold value.

7. The transportation and shipping management system according to claim 6, wherein the instruction unit determines a transportation quantity of the item to the nearest base from the warehouse or the relay base in consideration of a transportation capacity, and a total number of a transportation amount in accordance with replenishment of the item to the nearest base from the warehouse and the relay base and a transportation amount in accordance with shipment of the item to the customer from the warehouse and the relay base, and transmits the transportation quantity of the item by including the transportation quantity of the item in the transportation instruction.

8. The transportation and shipping management system according to claim 3,
   wherein the order reception unit is capable of also acquiring planned order placement information relating to order placement, which is a periodic purchase and the delivery date of which is not determined; and
   wherein the prediction unit predicts the demand quantity on the basis of the planned order placement information.

9. The transportation and shipping management system according to claim 1, wherein the submission instruction includes slip printing information for printing at least one of a tag label or an invoice.

10. The transportation and shipping management system according to claim 1,
    wherein the nearest base is present in a building; and
    wherein the delivery destination is a destination in the building.

11. The transportation and shipping management system according to claim 1, wherein the delivery destination is a destination that is present within a predetermined distance from the nearest base.

12. The transportation and shipping management system according to claim 1,
    wherein order placement for the items stored in the first container is performed in units of containers; and
    wherein an order reception unit determines that an order placement for shipping the first container in which the items are stored to the delivery destination is received when the reading value of the weight sensor of the first container transmitted via the communication device of the first container located at the delivery destination is less than a predetermined threshold value.

13. A transportation and shipping management method in a selling system for shipping out an item from a warehouse or a nearest base associated with a delivery destination in accordance with the delivery destination,
    the method comprising, executing by a computer:
    before receiving an order placement for an item from a customer, transmitting, to a warehouse server associated with the warehouse or a relay base server associated with a relay base, a transportation instruction for transporting the item to the nearest base from the warehouse or the relay base; and
    after receiving the order placement for the item from the customer, transmitting, to a nearest base server associated with the nearest base, a submission instruction for submitting the item, the order of which is placed, to the customer;
    wherein the item is present in plurality and at least a part of the items is stored in plurality in a first container;
    wherein the submission instruction includes an instruction for carrying the first container, which is temporarily stored in the nearest base and in which the plurality of items are stored, to the delivery destination and collecting a second container located at the delivery destination; and wherein the transportation and shipping management method further comprises, executing by the computer:
a billing instruction to a billing processing unit of a server, to automatically generate billing information on the basis of a difference between a reading value received from a weight sensor of the first container transmitted via a communication device of the first container, and a reading value received from a weight sensor of the second container transmitted via a communication device of the second container.

14. A non-transitory computer-readable medium storing therein a program for causing a computer to execute the steps of the method according to claim 13.

\* \* \* \* \*